(12) United States Patent
Addis

(10) Patent No.: US 8,366,115 B2
(45) Date of Patent: Feb. 5, 2013

(54) REPAIRABLE DOUBLE SIDED BRUSH SEAL

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 90 days.

(21) Appl. No.: 13/173,060

(22) Filed: Jun. 30, 2011

(65) Prior Publication Data
US 2013/0001883 A1    Jan. 3, 2013

(51) Int. Cl.
*F16J 15/44* (2006.01)
*F16J 15/34* (2006.01)

(52) U.S. Cl. .................. 277/355; 277/387; 277/403

(58) Field of Classification Search .......... 277/355, 277/387, 403
See application file for complete search history.

(56) References Cited

U.S. PATENT DOCUMENTS

| | | | |
|---|---|---|---|
| 5,029,875 A * | 7/1991 | Spain et al. | 277/307 |
| 5,114,159 A * | 5/1992 | Baird et al. | 277/355 |
| 6,079,714 A | 6/2000 | Kemsley | |
| 6,402,157 B1 | 6/2002 | Zhou et al. | |
| 6,406,027 B1 | 6/2002 | Aksit et al. | |
| 6,805,356 B2 | 10/2004 | Inoue | |
| 7,093,835 B2 * | 8/2006 | Addis | 277/355 |
| 7,226,054 B2 * | 6/2007 | Addis | 277/355 |
| 7,340,816 B2 | 3/2008 | Szymbor et al. | |
| 7,931,276 B2 * | 4/2011 | Szymbor et al. | 277/355 |
| 2003/0178778 A1 * | 9/2003 | Szymbor et al. | 277/355 |
| 2004/0041348 A1 * | 3/2004 | Addis | 277/355 |
| 2008/0029968 A1 | 2/2008 | Addis | |

FOREIGN PATENT DOCUMENTS
EP    2233801 A1    9/2010

* cited by examiner

*Primary Examiner* — Vishal Patel
*Assistant Examiner* — Nathan Cumar
(74) *Attorney, Agent, or Firm* — Kinney & Lange, P.A.

(57) ABSTRACT

A brush seal includes a plurality of bristles aligned in parallel to form a brush pack having a first end and a second end, and a joint securing the brush pack together. The joint is located centrally between the first end and the second end such that both the first end and the second end of the brush pack can form a sealing surface.

9 Claims, 3 Drawing Sheets

REPAIRABLE DOUBLE SIDED BRUSH SEAL

BACKGROUND

The present disclosure relates generally to seals, and more specifically to brush seals for gas turbine engines.

Brush seals are commonly used on gas turbine engines. The brush seals typically prevent secondary flow in the engine from escaping through a gap between a stationary part (e.g. a diffuser case) and a rotating part (e.g. a turbine shaft). Brush seals can have other uses, such as sealing a gap between stationary parts of the engine.

SUMMARY

A brush seal includes a plurality of bristles aligned in parallel to form a brush pack having a first end and a second end, and a joint securing the brush pack together. The joint is located centrally between the first end and the second end such that both the first end and the second end of the brush pack can alternately form a sealing surface.

A brush seal for sealing against a rotating surface in a gas turbine engine includes a plurality of bristles, a joint, a side plate, a back plate, and a retaining clip. The plurality of bristles are aligned in parallel to form a brush pack having a first end, a second end opposite the first end, an upstream side, and a downstream side opposite the upstream side. The joint is located centrally between the first end and the second end of the brush pack, and extends from the upstream side to the downstream side of the brush pack. The side plate is secured to an upstream side of the brush pack, and the back plate is secured to a downstream side of the brush pack. The retaining clip secures one of the first end and the second end of the brush pack between the side plate and the back plate such that the other of the first end and the second end forms a seal against the rotating surface.

A method of refurbishing a brush seal includes disassembling the brush seal to extract a brush pack having a used sealing surface and an opposite, un-used sealing surface. The method further includes rotating the brush pack 180 degrees such that the used sealing surface is replaced by the opposite, unused sealing surface, and reassembling the brush seal.

DETAILED DESCRIPTION

Figure 1:
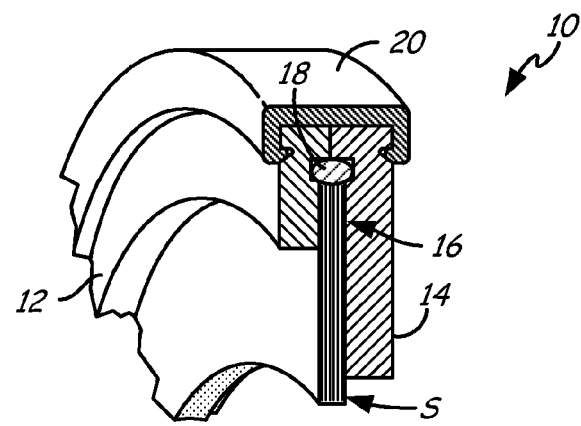
FIG. 1 is a perspective view of a brush seal in accordance with the prior art.

FIG. 1 is a perspective view of conventional brush seal 10 in accordance with the prior art. Brush seal 10 includes side plate 12, back plate 14, brush pack 16, weld 18, and retaining clip 20. Conventional brush seal 10 is configured to form a sealing surface against a rotating component in a gas turbine engine.

Side plate 12 and back plate 14 are metal plates that flank either side of brush pack 16. In other words, brush pack 16 is sandwiched in-between side plate 12 and back plate 14. Brush pack 16 includes a plurality of densely arranged wire bristles. Each individual wire bristle in brush pack 16 is formed by a length of wire, such as a 0.002" (0.00508 cm), 0.003" (0.00762 cm), 0.004 (0.01016 cm), or 0.006" (0.01524 cm) diameter cobalt alloy wire. One brush pack 16 can have approximately 5000 wire bristles per linear inch. The plurality of wire bristles is secured together at one end by weld 18 to form secure brush pack 16. Brush pack 16 can be internally secured between side plate 12 and back plate 14 by weld 18, or weld 18 can be brazed to side plate 12 and back plate 14. To further ensure the integrity of brush seal 10, retaining clip 20 externally secures brush pack 16 between side plate 12 and back plate 14. The free end of brush pack 16 (opposite weld 18) forms sealing surface S, which will wear over time. Once sealing surface S is worn beyond a certain point, brush seal 10 will need replacement. Replacement of entire brush seal 10 is common despite the fact that only sealing surface S of brush pack 16 is no longer usable.

Figure 2:
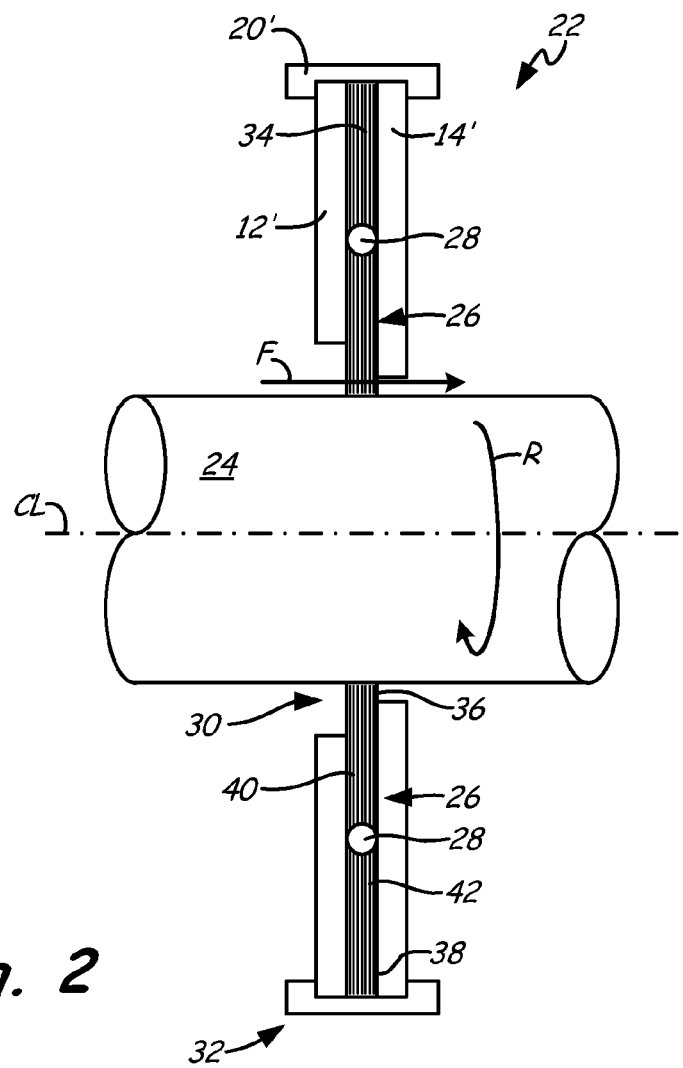
FIG. 2 is a cross sectional view of a brush seal and shaft in accordance with the present disclosure.

FIG. 2 is a cross sectional view of brush seal 22 abutting shaft 24 to form a pressure seal in accordance with the present disclosure. Brush seal 22 includes side plate 12', back plate 14', retaining clip 20', brush pack 26, joint 28, inner diameter (ID) 30, and outer diameter (OD) 32. Brush pack 26 further includes wire bristles 34, first end 36, second end 38, upstream side 40, and downstream side 42. When first end 36 becomes worn from use, brush pack 16 can be flipped such that second end 38 abuts shaft 24 to form a pressure seal, thereby doubling the life of brush seal 22.

Brush seal 22 has some similar features to brush seal 10 described above, and like reference numerals indicate like components. Fluid (e.g. air) flows from upstream to downstream between brush seal 22 and shaft 24 as indicated by arrow F. Shaft 24 around center line CL as indicated by arrow R. Brush seal 22 is disposed annularly around shaft 24 for sealing fluid flow. Side plate 12' is located on an upstream side of brush seal 22, and back plate 14' is located on a downstream side of brush seal 22. Brush pack 26 is sandwiched in-between side plate 12' and back plate 14'. Brush pack 26 includes a plurality of wire bristles 34, which are arranged in parallel to one another, and secured together by flexible joint 28. Joint 28 extends through entire brush pack 26 to secure bristles 34 together. In one embodiment, joint 28 is a weld, which is brazed to side plate 12' and back plate 14' to internally secure brush pack 26 to both side plate 12' and back plate 14'. To further ensure the integrity of brush seal 22, retaining clip 20' externally secures brush pack 26 between side plate 12' and back plate 14'. Retaining clip 20' can have a "snap fit" arrangement with side plate 12' and back plate 14'.

Brush seal 22 has ID 30, which is disposed adjacent an outer surface of shaft 24, and opposite OD 32 located radially outward from shaft 24. Viewed in cross section, brush pack 22 is rectangular and defined on four sides by first end 36, second end 38, upstream side 40, and downstream side 42. First end 36 of brush pack 26 is "free" (i.e. not shielded or enclosed) and located at ID 30 so that it can form a seal against shaft 24. Opposite second end 38 of brush pack 26 is "retained" and located at OD 32. More specifically, second end 38 is shielded on upstream side 40 by side plate 12', shielded on downstream side 42 by back plate 14', and enclosed radially by retaining clip 20'. Joint 28 is centrally located along brush pack 26 at an approximate midpoint between first end 36 and second end 38. Bristles 34 extend both radially outward from joint 28 and radially inward from joint 28. Accordingly, brush pack 26 has two functional ends: first end 36 (currently in use) and second end 38 (for later use). In the depicted embodiment, first end 36 forms a seal with shaft 24. Once first end 36 is worn from use, brush pack 26 can be rotated or flipped 180 degrees such that first end 36 and second end 38 exchange places within brush seal 22. Brush pack 26 is therefore, "double sided" to double the life of brush seal 22.

Figure 3:
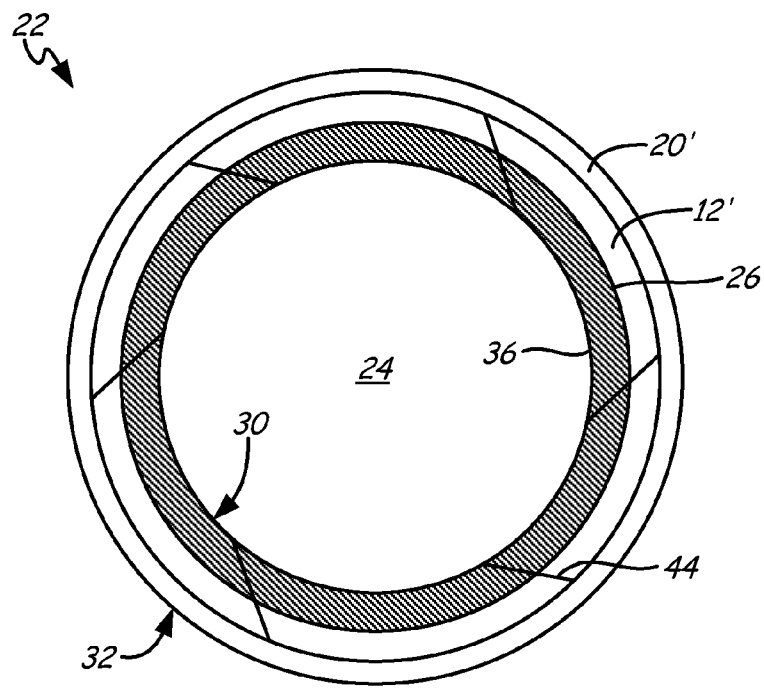
FIG. 3 is an upstream side view of the brush seal from FIG. 2.
Figure 4:
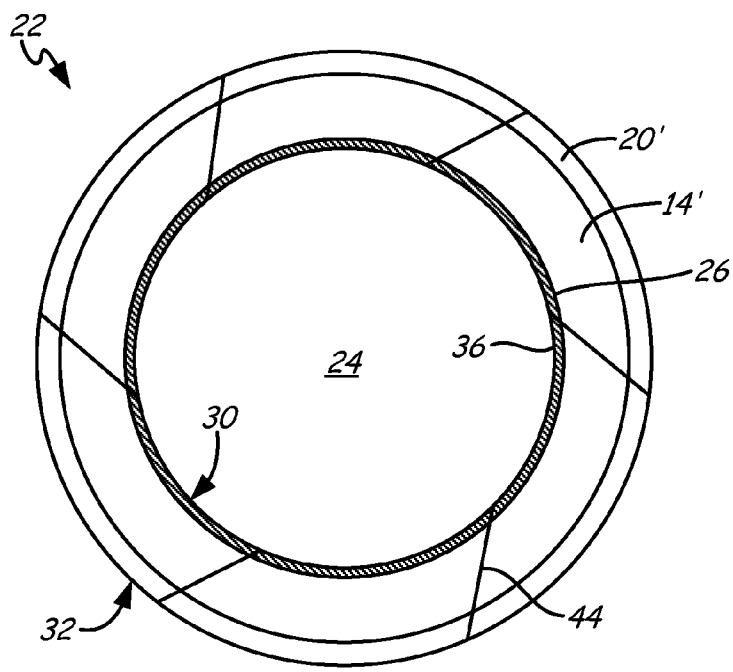
FIG. 4 is a downstream side view of the brush seal from FIGS. 2 & 3.

FIG. 3 is an upstream side view and FIG. 4 is a downstream side view of brush seal 22 and shaft 24. Depicted in FIG. 3 are side plate 12', retaining clip 20', brush seal 22, shaft 24, brush pack 26, internal diameter (ID) 30, external diameter (OD) 32, first end 36, and segment joints 44. Depicted in FIG. 4 are back plate 14', retaining clip 20', brush seal 22, shaft 24, brush pack 26, internal diameter (ID) 30, external diameter (OD) 32, and first end 36, and segment joints 44.

Assembled brush seal 22 is annular and encircles shaft 24. First end 36 of brush pack 26 is located just radially outward from the outer surface of shaft 24. In other words, first end 36 of brush pack 26 is located at ID 30 of brush seal 22. When viewed from the upstream side (FIG. 3), side plate 12' is located just radially outward from brush pack 26. When viewed from the downstream side (FIG. 4), back plate 14' is located just radially outward from brush pack 26. On FIG. 3 retaining clip 20' is located radially outward from side plate 12', and on FIG. 4 retaining clip is located radially outward from back plate 14'. In other words, retaining clip 20' is located at OD 32 of brush seal 22. First end 36 of brush pack 26 includes a plurality of bristles, which extend at an approximately 45 degree angle to shaft 24, thereby increasing their compliance and ability to flex. Brush seal 22 is manufactured in segments, which are assembled at segment joints 44 to form annular brush seal 22 around shaft 24. Although six segments joints 44 are shown, more or less segment joints 44 are equally possible. Segment joints 44 share the same approximately 45 degree angle as the plurality of bristles at first end 36 of brush pack 26. After use, first end 36 becomes worn, and brush seal 22 will require replacement or refurbishment.

To refurbish brush seal 22 at overhaul, it must first be disassembled. Disassembly includes removing retaining clip 20' from OD 32, heating the remaining assembly (side plate 12', back plate 14', brush pack 26, and joint 28) in an oven, and removing the side plate 12' and back plate 14' from the brush pack 26. Once the brush pack 26 is isolated, it is rotated or flipped 180 degrees such that first end 36 (worn from being the sealing end) is replaced with second end 38 (unused). Next, brush seal 22 is reassembled. Brush pack 26 is again sandwiched between, and internally secured, to side plate 12' and back plate 14' (e.g. by re-brazing and/or re-heating in an oven). Retaining clip 20' is then secured externally to brush pack 26, side plate 12', and back plate 14' at first end 36. Accordingly, first end 36 is retained by retaining clip 20' and becomes OD 32 of brush seal 22 while second end 38 is free and becomes ID 30 of brush seal 22. Once brush seal 22 is refurbished, its segments can be reassembled around shaft 24 such that second end 38 forms a new seal with shaft 24. The presently described doubled-sided brush seal 22 will have double the life of conventional brush seal 10.

Figure 5A:
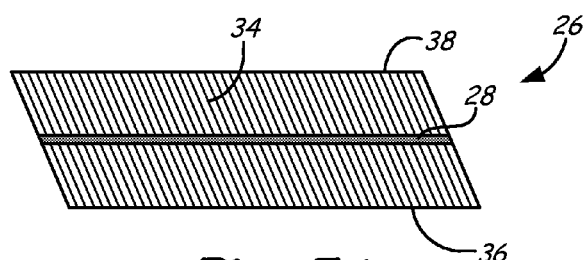
FIG. 5A is a perspective view.
Figure 5B:
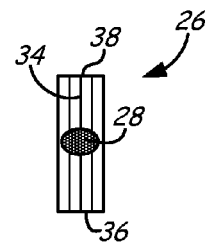
FIG. 5B is a cross sectional view, of the brush seal as manufactured.
Figure 6A:
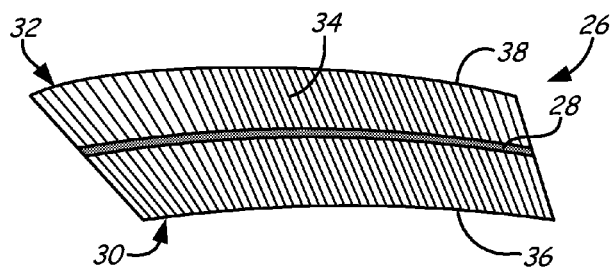
FIG. 6A is a perspective view.
Figure 6B:
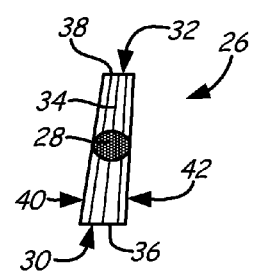
FIG. 6B is a cross sectional view, of the brush seal during a first wear cycle.
Figure 7A:
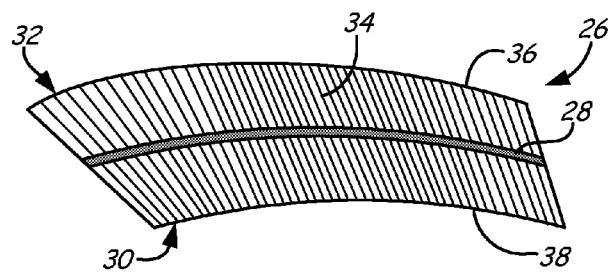
FIG. 7A is a perspective view.
Figure 7B:
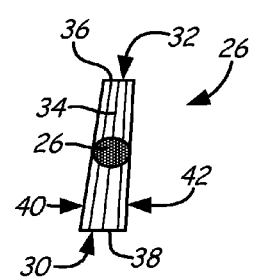
FIG. 7B is a cross sectional view, of the brush seal during a second wear cycle.

FIG. 5A is a perspective view, and FIG. 5B is a cross sectional view, of brush pack 26 as manufactured. FIG. 6A is a perspective view, and FIG. 6B is a cross sectional view, of brush pack 26 during a first wear cycle. FIG. 7A is a perspective view, and FIG. 7B is a cross sectional view, of brush pack 26 during a second wear cycle. FIGS. 5A-7A can be viewed in series, and FIGS. 5B-7B can be viewed in series, to demonstrate the life cycle of brush pack 26. Depicted in FIG. 5A are components of brush pack 26: joint 28, wire bristles 34, first end 36, and second end 38, upstream side 40, and downstream side 42. Depicted in FIG. 6A-7B are ID 30, OD 32 and components of brush pack 26: joint 28, wire bristles 34, first end 36, and second end 38, upstream side 40, and downstream side 42. After a first wear surface (e.g. first end 36) is worn from use, brush pack 26 is flipped and used for a second cycle with second wear surface (e.g. second end 38) adjacent a rotating structure, such as shaft 24 from FIGS. 2-4.

In FIGS. 5A and 5B, brush pack 26 as manufactured is shown. Bristles 34 are straight and extend parallel to one another. In other words, bristles 34 form a straight line from first end 36, through joint 28, to second end 38. A diameter of first end 36 of brush pack 26 is substantially equal to a diameter of second end 38 of brush pack 26. After manufacturing, brush pack 26 is curved for insertion between side plate 12' and back plate 14', as shown in FIGS. 6A and 6B.

In FIGS. 6A and 6B, brush pack 26 has been curved for use during a first wear cycle. More specifically, bristles 34 are bent around joint 28 such that bristles 34 arc from a second end 38, through joint 28, to first end 36. This curvature of brush pack 26 decreases a density of bristles 34 at first end 36 and increases a density of bristles at second end 38. A diameter of first end 36 of brush pack 26, which is located at ID 30 for use as a first wear surface, is greater than a diameter of second end 38 of brush pack 26, which is located at OD 32 and will fit within retaining clip 20'. Once first end 36 is worn from use, brush pack 26 is removed and flipped for re-use during a second wear cycle, as shown in FIGS. 7A and 7B.

In FIGS. 7A and 7B, brush pack 26 has been curved for use during a second wear cycle. More specifically, bristles 34 are bent around joint 28 such that bristles 34 arc from a first end 36, through joint 28, to second end 38. This curvature of brush pack 26 decreases a density of bristles 34 at second end 38 and increases a density of bristles at first end 36. A diameter of second end 38 of brush pack 26, which is located at ID 30 for use as a second wear surface, is greater than a diameter of first end 36 of brush pack 26, which is located at OD 32 and will fit within retaining clip 20'. Once second end 38 has worn from use, brush pack 26 is removed and replaced with a new brush pack 26.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A brush seal for sealing against a rotating surface in a gas turbine engine, the brush seal comprising:
    a plurality of bristles aligned in parallel to form a brush pack having a first end, a second end opposite the first end, an upstream side, and a downstream side opposite the upstream side;
    a weld joint located centrally between the first end and the second end of the brush pack, and extending from the upstream side to the downstream side of the brush pack;
    a side plate secured to an upstream side of the brush pack;
    a back plate secured to a downstream side of the brush pack; and a retaining clip securing one of the first end and the second end of the brush pack between an end of the side plate and an end of the back plate such that the other of the first end and the second end forms a seal against the rotating surface, the retaining clip being spaced radially from the weld joint and located adjacent the ends of the brush pack, the side plate, and the back plate.

2. The brush seal of claim 1, wherein the side plate and the back plate are brazed to the weld joint.

3. The brush seal of claim 1, wherein the first end and the second end of the brush pack are angled at about 45 degrees.

4. The brush seal of claim 1, wherein the brush seal is segmented by segment joints angled at about 45 degrees.

5. A method of refurbishing the brush seal of claim 1, the method comprising:
   disassembling the brush seal to extract the brush pack having a used sealing surface at its first end and an opposite, un-used sealing surface at its second end;
   rotating the brush pack 180 degrees such that the used sealing surface is replaced by the opposite, unused sealing surface; and
   reassembling the brush seal.

6. The method of claim 5, wherein disassembling the brush seal comprises:
   removing the retaining clip from the brush pack;
   heating the brush pack, the side plate, and the back plate; and
   removing the side plate and the back plate from the brush pack.

7. The method of claim 6, wherein an oven is used to heat the brush pack, the side plate, and the back plate.

8. The method of 5, wherein reassembling the brush seal comprises:
   brazing the side plate and the back plate onto opposite sides of the brush pack;
   heating the brush pack, the side plate, and the back plate; and
   clipping the used sealing surface of the brush pack between the side plate and the back plate with a retaining clip.

9. The method of claim 8, wherein an oven is used to heat the brush pack, the side plate, and the back plate.

* * * * *